United States Patent [19]
Ohsaki et al.

[11] Patent Number: 5,691,841
[45] Date of Patent: Nov. 25, 1997

[54] STAGE DRIVING APPARATUS

[75] Inventors: Mikio Ohsaki, Yokohama; Jiro Mizuno, Fujisawa, both of Japan

[73] Assignee: Nikon Corporation, Tokyo, Japan

[21] Appl. No.: 586,182

[22] Filed: Jan. 16, 1996

[30] Foreign Application Priority Data

Jan. 17, 1995 [JP] Japan ................................ 7-004913

[51] Int. Cl.$^6$ .................... G02B 21/26; G02B 21/00; G01N 21/01
[52] U.S. Cl. .................. 359/391; 359/392; 359/393; 359/394; 359/368; 359/398; 250/49.1
[58] Field of Search ..................... 359/391, 392, 359/393, 394, 368, 398; 250/491.1

[56] References Cited

U.S. PATENT DOCUMENTS

| | | | |
|---|---|---|---|
| 4,029,949 | 6/1977 | Dew | 235/151.11 |
| 4,624,537 | 11/1986 | Hanssen et al. | 359/393 |
| 5,153,494 | 10/1992 | Hollis, Jr. | 318/640 |
| 5,357,366 | 10/1994 | Marchlenski | 359/393 |
| 5,367,401 | 11/1994 | Saulietis | 359/398 |
| 5,523,941 | 6/1996 | Burton et al. | 364/167.01 |
| 5,557,456 | 9/1996 | Garner et al. | 359/393 |
| 5,587,833 | 12/1996 | Kamentsky | 359/393 |

FOREIGN PATENT DOCUMENTS

406118307  4/1994  Japan ..................... 359/391

*Primary Examiner*—Paul M. Dzierzynski
*Assistant Examiner*—Mohammad Y. Sikder
*Attorney, Agent, or Firm*—Shapiro and Shapiro

[57] ABSTRACT

A stage driving apparatus comprises a stage mounted with a sample and rotatable about an optical axis of an observation optical system for observing the sample, and two guides, for moving the stage within a plane perpendicular to the optical axis of the observation optical system, rotatable together with the stage and oriented orthogonal to each other. The apparatus further comprises an input device for inputting a signal representing a moving direction of the stage, a converter for converting a signal inputted to the input device on the basis of an observation image of the sample on the stage through the observation optical system into an output signal with a compensated relative rotational deviation between a moving direction defined by the observation image and a moving direction defined by the two guides and a driving device for moving the stage along the two guides on the basis of the output signal from the converter.

16 Claims, 9 Drawing Sheets

STAGE DRIVING APPARATUS

BACKGROUND OF THE INVENTION

1. Field of the Invention

The present invention relates generally to a stage driving apparatus and, more particularly, to a stage driving apparatus for a microscope.

2. Related Background Art

For the purpose of performing trimming in photography through a microscope or making a polarizing observation and a differential interference observation, it is desirable that a stage of the microscope be rotatable and movable two-dimensionally. One example of a construction of such a known microscope is that the stage mounted with a sample be rotatable about an optical axis of an observation optical system and be slid along a guide in a crosswise direction (hereinafter referred to as an "X-directional guide") and a guide in a lengthwise direction (hereinafter referred to as a "Y-directional guide") within a plane perpendicular to the optical axis of the observation optical system. In the thus constructed microscope, e.g., a joy stick may be given as an input member for inputting an operation signal for sliding the stage.

The operation signal inputted to the joy stick is outputted to a drive device for driving the stage. That is, when an operation lever of the joy stick is skewed in the crosswise direction, the drive device is operated, and the stage slides crosswise along the X-directional guide. On the other hand, when the operation lever is skewed in the lengthwise direction, the stage slides lengthwise along the Y-directional guide. Further, for instance, when the operation lever is skewed rightward obliquely at 45°, the stage slides equal distances respectively along the X- and Y-directional guides and therefore slides in the rightward oblique 45° direction. Thus, skew directions of the operation lever of the joy stick are coincident with moving directions of the stage along the two orthogonal guides.

There arise, however, the following problems inherent in the conventional microscope. For example, when the stage rotates through θ° from a fiducial initial rotating position (hereinafter termed a fiducial rotating position), the X- and Y-directional guides also rotate through θ° concomitantly with the stage. In this state, when the operation lever of the joy stick is skewed, e.g., in the crosswise direction, it follows that the stage moves not in the crosswise direction with respect to an observer but along the X-directional guide in a direction rotating through θ° from that direction. Further, in this state, when the operation lever is skewed in the lengthwise direction, the stage moves not in the lengthwise direction with respect to the observer but along the Y-directional guide in a direction rotating through θ° from that direction.

This is also the same as considering an observation image observed through an eyepiece of the microscope. That is, even when the joy stick is skewed crosswise to move the sample in the crosswise direction while the observer observes the sample, the observation image moves not in the crosswise direction but in the direction inclined at θ° from that direction.

Thus, in the state where the stage rotates through θ°, there is caused a relative deviation between the skew direction of the operation lever of the joy stick and the moving direction of the observation image observed through the eyepiece. Accordingly, the observer needs to operate the joy stick in consideration of the above relative deviation between the skew direction of the operation lever and the moving direction of the observation image. For instance, when the sample for observation is to be moved crosswise, the operation lever of the joy stick has to be operated in a direction inclined at −θ° from the crosswise direction. Further, when the sample is to be moved in the lengthwise direction, the operation lever has to be operated in a direction inclined at −θ° from the lengthwise direction.

Thus, in the conventional microscope, if the rotating position of the stage deviates from the fiducial rotating position, there is caused the relative deviation between the skew direction of the operation lever of the joy stick and the moving direction (moving direction of the observation image with respect to the observer) of the stage with respect to the microscope body. Consequently, the operation of the stage becomes troublesome and requires considerable skill. It is also difficult for the observer to quickly move the sample to the desired position.

SUMMARY OF THE INVENTION

Accordingly, it is a primary object of the present invention to provide an apparatus capable of observing a sample on a stage by quickly moving it to a desired position with a simple operation to move the stage.

A stage driving apparatus according to the present invention comprises a stage mounted with a sample and rotatable about an optical axis of an observation optical system for observing the sample and two guides, for moving said stage within a plane perpendicular to the optical axis of the observation optical system, rotatable together with the stage and orthogonal to each other. The apparatus further comprises an input device for inputting a signal representing a moving direction of the stage, a converter for converting a signal inputted to the input device on the basis of an observation image of the sample on the stage through the observation optical system into an output signal with a compensated relative rotational deviation between a moving direction defined by the observation image and a moving direction defined by the two guides and a driving device for moving the stage along the two guides on the basis of the output signal from the converter.

According to the apparatus of the present invention, when the converter converts the stage operation signal inputted to the input member, it is possible to compensate a relative angular deviation between the observation image and the guide for moving the stage that is caused due to a rotation of the stage. According to the present invention, the stage moving command direction inputted to the input member is coincident with the moving direction of the observation image observed through an eyepiece, and, therefore, the stage moving command can be outputted without considering an angle of rotation of the stage. Accordingly, the moving operation for the stage in the microscope is simplified, and the quick observation can be also conducted.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Figure 1:
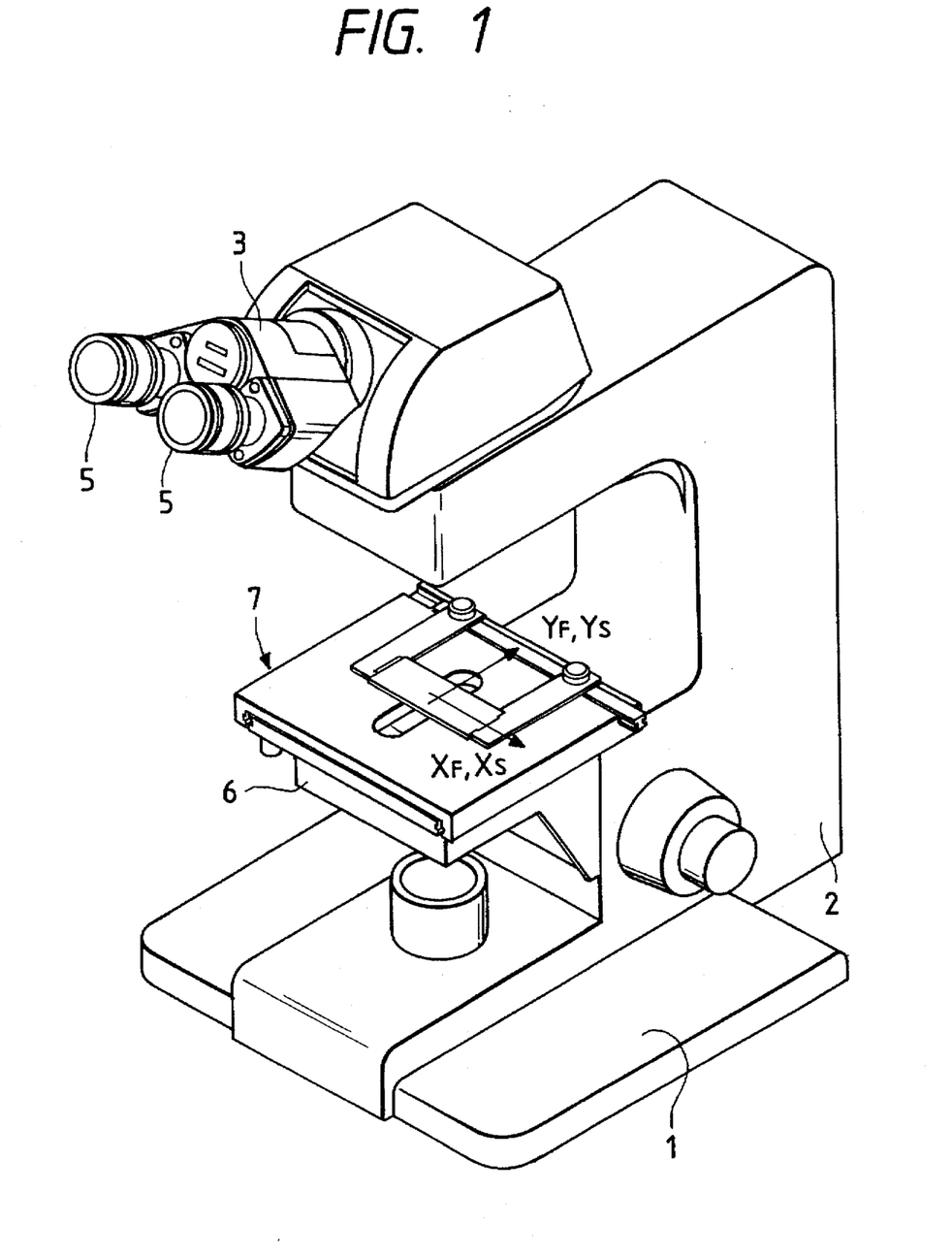
FIG. 1 is a perspective view illustrating a microscope.
Figure 2:
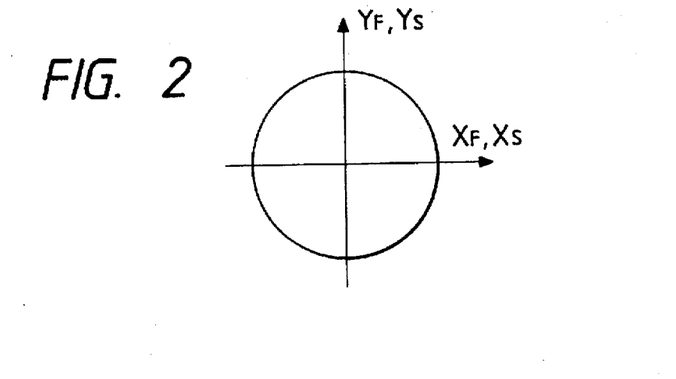
FIG. 2 is a diagram showing a relationship between $X_F$- and $Y_F$-axes and $X_S$- and $Y_S$-axes in a state where an angle of rotation of a stage is 0°.

FIG. 1 is a perspective view illustrating a microscope in a first embodiment of the present invention. Eyepieces 5 attached to a lens barrel 3 are disposed upwardly of an arm 2 supported on a base 1. A substage 6 is provided in front of and at the center of the arm 2. A stage 7 is rotatably mounted on an upper surface of this substage 6. FIG. 1 shows a case where a rotational position of the stage is an initial rotational position (fiducial rotational position), i.e., an angle of rotation is 0°. Now, herein, there are set an $X_F$-axis indicating the horizontal direction and a $Y_F$-axis indicating the vertical direction with respect to an observation image observed through the eyepieces 5. Set further are an $X_S$-axis indicating the horizontal direction and a $Y_S$-axis indicating the vertical direction with respect to the stage 7. When the angle of rotation is 0°, as illustrated in FIG. 2, the $X_F$- and $Y_F$-axes are coincident with the $X_S$- and $Y_S$-axes, respectively.

Figure 3:
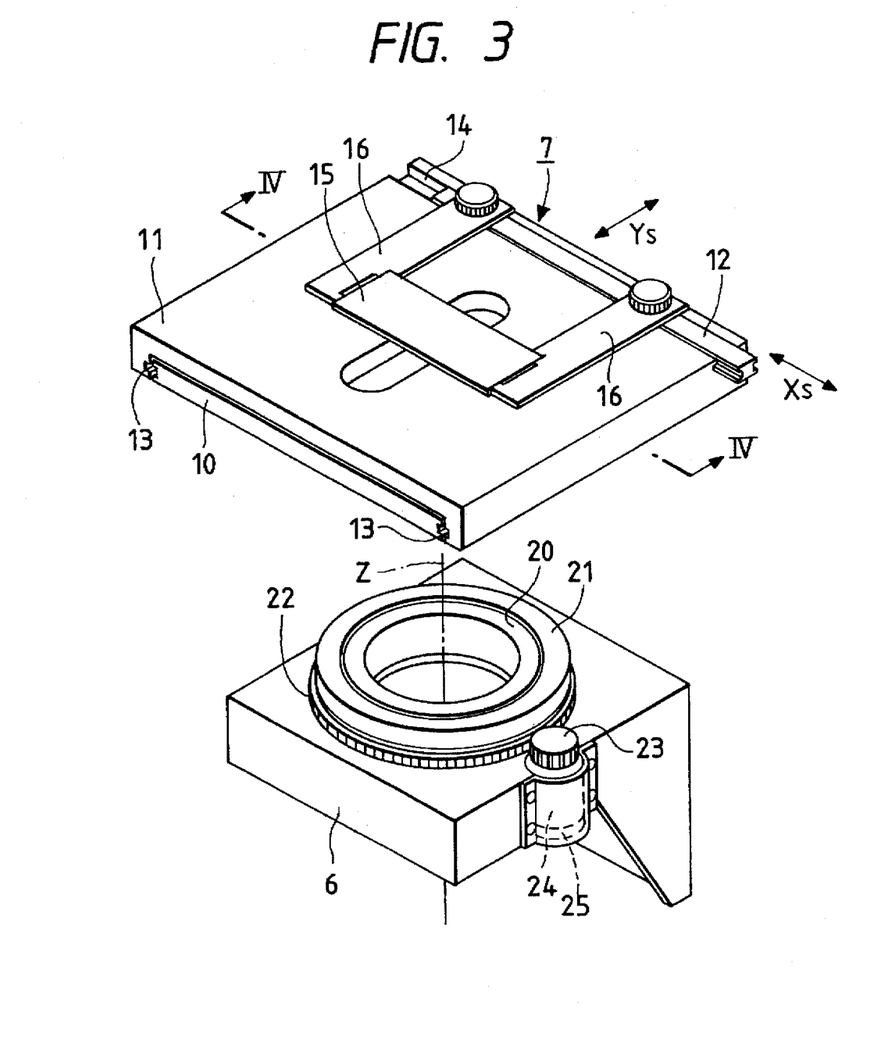
FIG. 3 is an exploded view of the stage.
Figure 4:
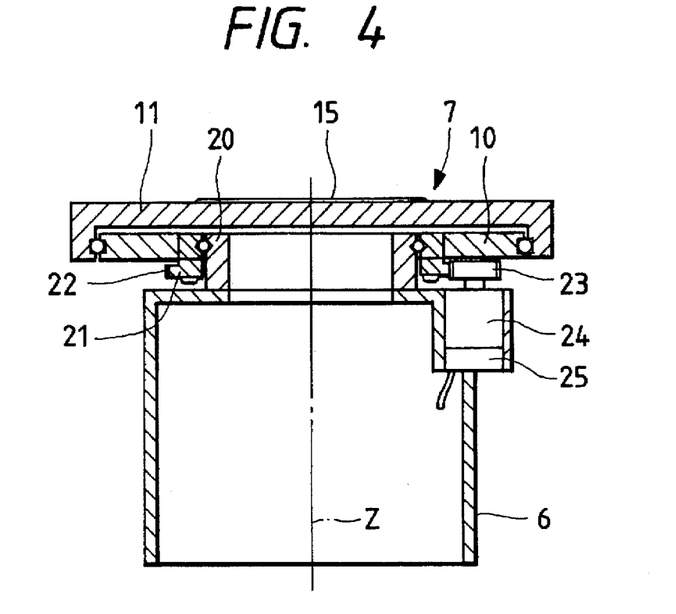
FIG. 4 is a sectional view taken along the arrowed line IV—IV of FIG. 3.

FIG. 3 is an exploded view of the stage 7. FIG. 4 is a sectional view taken along the arrowed line IV—IV. The stage 7 is equipped with guide members 10, 11 and 12. The guide member 11 is supported through races 13, 13 on both ends of the guide member 10. The guide member 11 is supported by those races 13 and are thereby slidable along the $Y_S$-axis defined as an axis indicating the vertical direction on the stage 7 as explained above. Then, the guide member 11 is so constructed as to slide in the $Y_S$-axis direction by operating a driving device (not shown) constructed of, e.g., ball screws and a linear motor, etc. On the other hand, the guide member 12 is supported by races 14 formed on an upper surface of the guide member 11 and is thereby slidable in the direction of the $X_S$-axis defined as an axis indicating the horizontal direction on the stage 7 as explained above. Then, the guide member 12 is so constructed as to slide in the $X_S$-axis direction by operating a driving device (not shown) constructed of, e.g., ball screws and a linear motor, etc. The guide member 12 is mounted with a couple of chuck arms 16 for seizing a slide glass 15 for holding a sample.

Fixed onto an upper surface of the substage 6 is an inner drum 20 with an optical axis Z of an observation optical system of this microscope being the center thereof. An outer drum 21 is so attached to the periphery of this inner drum 20 as to be rotatable about the optical axis Z. A gear 22 is formed along the periphery of this outer drum 21, and a small gear 23 meshing with this gear 22 is secured to a drive shaft of a motor 24 fixed to the substage 6. The construction of this embodiment is that an operating quantity of this motor 24 is detected by an absolute encoder 25. As illustrated in FIG. 4, the guide member 10 of the above stage 7 is mounted to this outer drum 21.

Next, an inputting member for inputting an operation signal for the stage 7 will be discussed.

Figure 5:
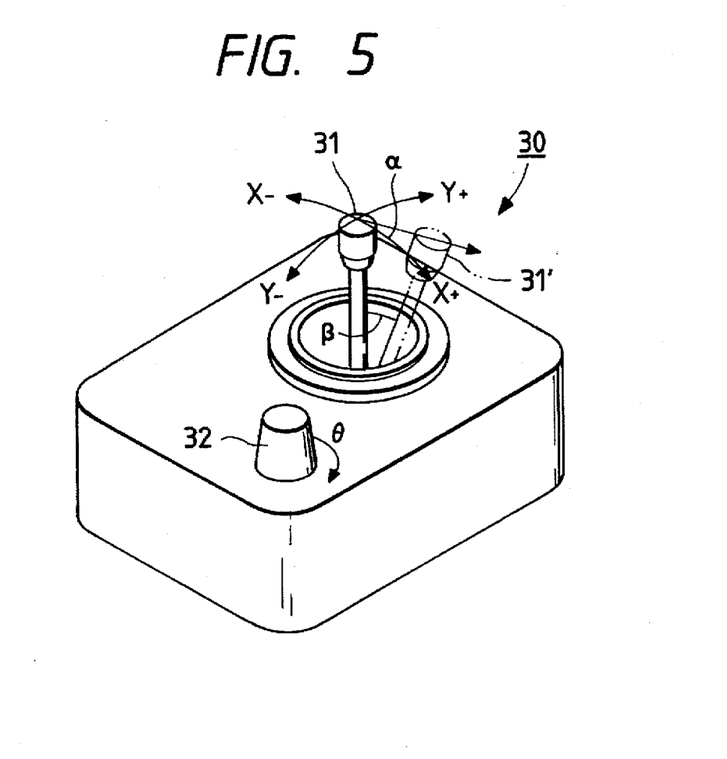
FIG. 5 is a perspective view illustrating a joy stick.

At first, FIG. 5 is a perspective view of a joy stick 30 serving as an inputting member. The joy stick 30 includes an operation lever 31 for inputting an operation signal for sliding the stage 7 and an operation dial 32 for inputting an operation signal for rotating the stage 7. The Figure shows a state where the operation lever 31 shown by the solid line is in a neutral position. The operation lever 31 can be manipulated with a skew in an arbitrary direction from the neutral position indicated by this solid line by pushing it with a finger. The operation lever 31 is, when the finger gets separated therefrom, returns to the neutral position. Then, a direction in which the stage 7 slides is determined by the skew direction of the operation lever 31, while a speed at which the stage 7 slides is determined by a skew angle of the operation lever 31. For example, as explained above in FIG. 2, when the angle of rotation of the stage 7 is 0°, and if the $X_F$- and $Y_F$-axes are coincident with the $X_S$- and $Y_S$-axes, the operation lever 31 of the joy stick 30 shown in FIG. 5 is skewed in a α° direction from an "X+" direction as indicated by a one-dotted line 31' in the Figure. As a result, the guide member 11 slides in the $Y_F$-axis ($Y_S$-axis) direction with respect to the guide member 10, while the guide member 12 slides in the $X_F$-axis ($X_S$-axis) direction with respect to the guide member 11. With this operation, the sample held in the slide glass 15 moves in the α° direction from the $X_F$-axis ($X_S$-axis). Further, if an angle β at which the operation lever 31 is inclined from the neutral position is relatively large, the sample moves fast. Whereas if the angle β is relatively small, the sample moves slow. Note that the above-described stage 7 is slid by operating the driving device as explained earlier.

On the other hand, the operation dial 32 can be rotatably operated, and a quantity of rotation of the stage 7 is determined based on a quantity of rotation of the operation dial 32. For example, when the operation dial 32 is rotated from the fiducial position thereof, the motor 24 explained before with reference to FIGS. 3 and 4 is operated. Then, the stage constructed of the guide members 10, 11 and 12 is integrally rotated through θ° from the fiducial rotational position. It is to be noted that the rotational quantity of the stage 7 is detected by the absolute encoder 25 through an operation quantity of the motor 24 in this embodiment.

Figure 6:
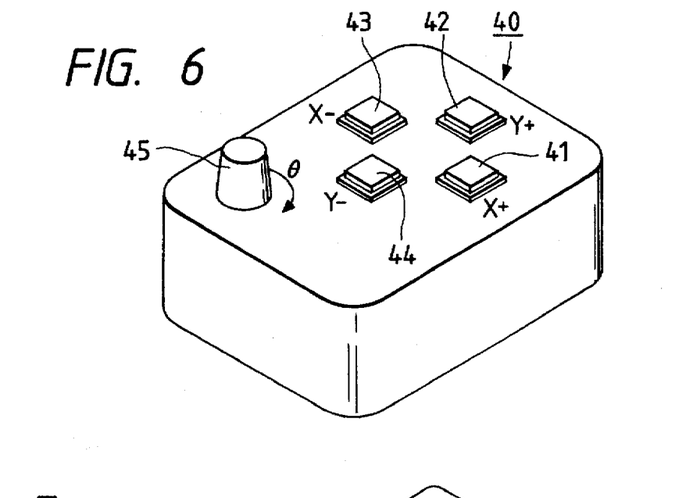
FIG. 6 is a perspective view illustrating a jog shuttle.

Further, FIG. 6 is a perspective view illustrating a jog shuttle 40 by way of another example of the inputting member. The jog shuttle 40 has operation buttons 41–44 for inputting an operation signal for sliding the stage 7 and an operation dial 45 for inputting an operation signal for rotating the stage 7. As illustrated in FIG. 2, the guide member 12, when pushing the operation button 41 in a state where the angle of rotation of the stage 7 is 0°, slides in a (+) direction (right direction in FIG. 2) of the $X_F$-axis ($X_S$-axis) with respect to the guide member 11 but slides, when pushing the operation button 43, a (−) direction (left direction in FIG. 2) of the $X_F$-axis ($X_s$-axis) with respect to the guide 11. Similarly, the guide member 11, when pushing the operation button 42 (or 44), slides in the (+) (or (−)) direction (up or down direction in FIG. 2) of the $Y_F$-axis ($Y_s$-axis) with respect to the guide member 10. Thus, the jog shuttle 40 is capable of moving the sample held in the slide glass 15 to a desired position by properly operating the operation buttons 41–44. On the other hand, the operation dial 45 is constructed absolutely in the same way as the operation dial 32 of the joy stick 30 explained above, and therefore its explanation will be omitted.

Figure 7:
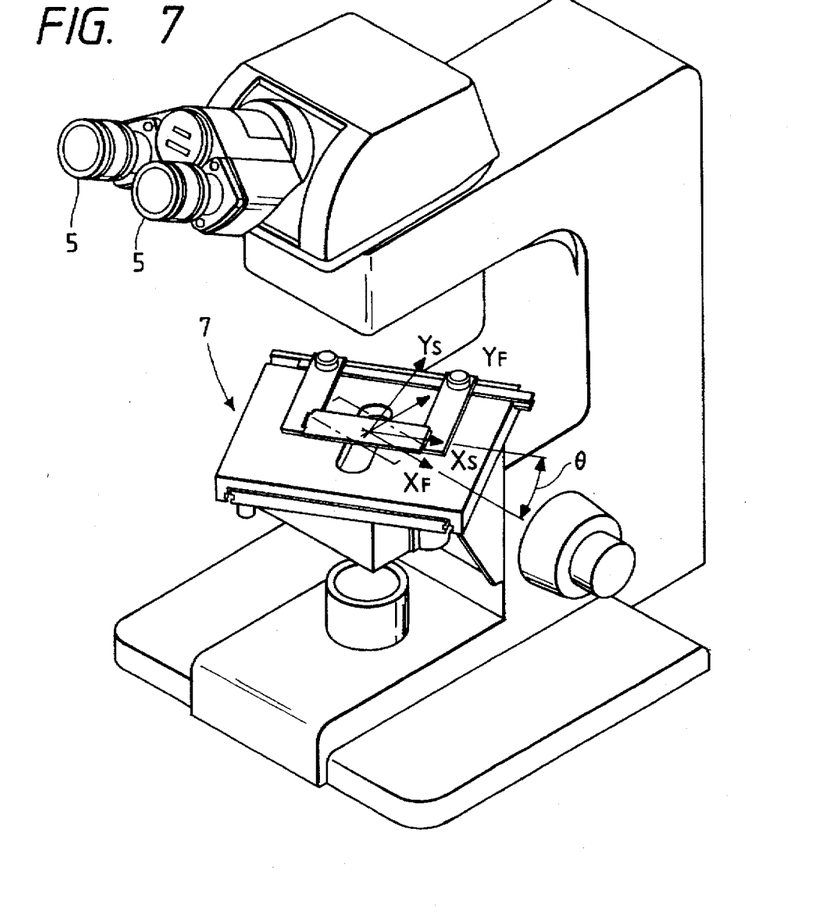
FIG. 7 is a perspective view illustrating a microscope in which the stage is rotated through θ°.

FIG. 7 is a perspective view of the microscope in a state where the stage 7 is thus rotated through $\theta°$. At this time, the preset relationship between the $X_F$- and $Y_F$-axes and the $X_s$- and $Y_s$-axes goes as in a state where the, $X_s$-axis rotates through $\theta°$ from the $X_F$-axis, while the $Y_s$-axis rotates through $\theta°$ from the $Y_F$-axis as shown in FIG. 8.

Figure 8:
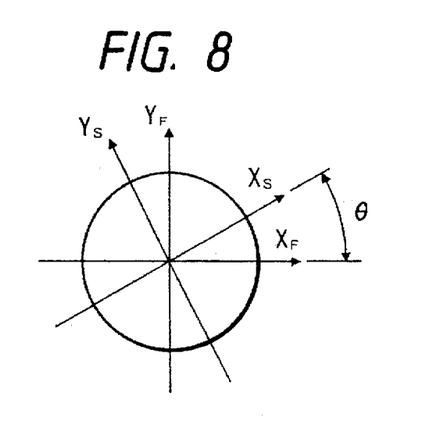
FIG. 8 is a diagram showing a relationship between the $X_F$- and $Y_F$-axes and the $X_S$- and $Y_S$-axes in the state where the angle of rotation of the stage is θ°.
Figure 9:
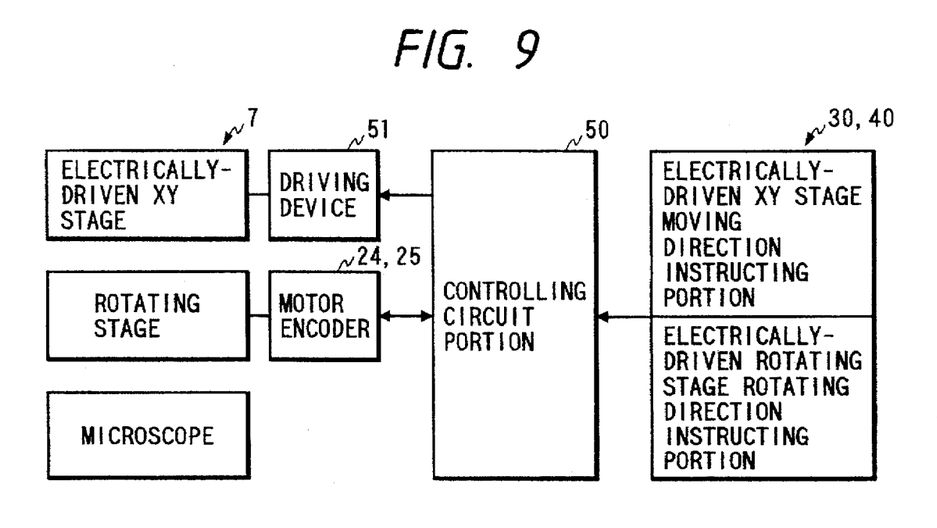
FIG. 9 is a block diagram schematically illustrating a construction of the microscope in a first embodiment of the present invention.

FIG. 9 is a block diagram schematically illustrating a construction of the microscope in this embodiment. Operation signals from the joy stick 30 and the jog shuttle 40 serving as the input members are inputted to a control circuit 50 and, after being converted in the control circuit 50 as will be explained in greater detail, outputted to a driving device 51 of the stage 7. Further, in this embodiment, the rotational quantity of the stage 7, which has been detected by the absolute encoder 25, is inputted to the control circuit 50. The following explains how the signal in the control circuit 50 is converted for compensating a relative angular deviation between the $X_F$- and $Y_F$-axes on the basis of the observation image of the sample and the $X_s$- and $Y_s$-axes on the basis of the stage 7, i.e., for compensating the angle-of-rotation $\theta$ previously explained in FIG. 8.

Figure 10:
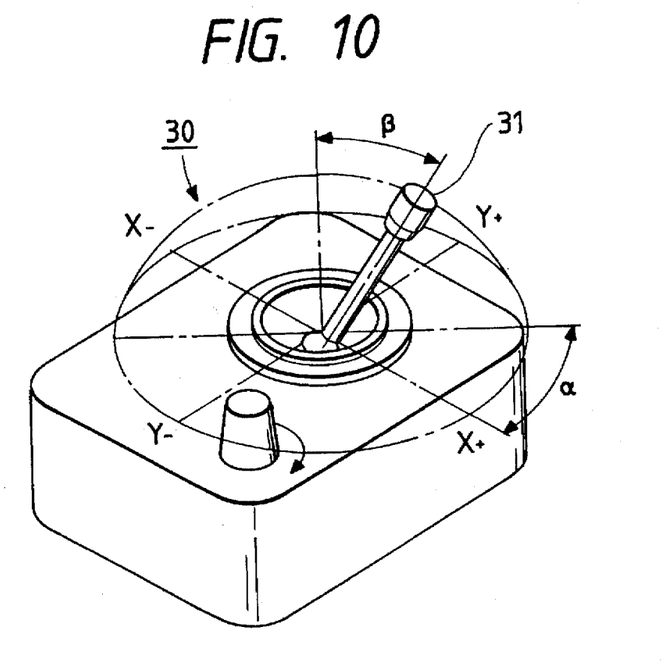
FIG. 10 is a perspective view of a joy stick in a state where an operation lever is skewed at β° from a neutral position in a α° direction from an "X+" direction.

To start with, there will be explained a case where the operation lever 31 of the joy stick 30 is, in the rotated-through-$\theta°$-state of the stage 7 as shown in FIGS. 7 and 8, skewed at $\beta°$ from the neutral position in the $\alpha°$ direction from the "X+" direction as illustrated in FIG. 10. If no signal conversion is performed, it follows that the sample would be moved in a further-deviated-by-$\alpha°$ direction from the $X_s$-axis deviated by $\theta°$ from the $X_F$-axis. That is, it follows that the sample would be moved in a ($\theta+\alpha°$) direction.

Thus, the invention provides a conversion is to be executed in the control circuit 50 to eliminate an influence by a deviation angle $\theta$ between relative angles made by the $X_F$- and $Y_F$-axes and by the $X_s$- and $Y_s$-axes. Outputted to the slide member of the stage 7 are output signals calculated by the following formulae (1) and (2):

$$X_s\text{-Directional Speed Component} = L\cos(\alpha-\theta) \quad (1)$$

$$Y_s\text{-Directional Speed Component} = L\sin(\alpha-\theta) \quad (2)$$

where L is the speed coefficient (mm/s) corresponding to a skew angle $\beta$ of the operation lever 31. If the skew angle $\beta$ becomes larger, the speed coefficient L also increases. Whereas if the skew angle becomes smaller, the speed coefficient L decreases. Further, a ratio R of the $X_s$-directional speed component to the $Y_s$-directional speed component is calculated by the following formula (3):

$$\begin{aligned} R &= Y_s-\text{Directional Speed Component}/X_s-\text{Directional} \\ &\quad \text{Speed Component} \\ &= L\sin(\alpha-\theta)/L\cos(\alpha-\theta) \end{aligned} \quad (3)$$

Figure 11:
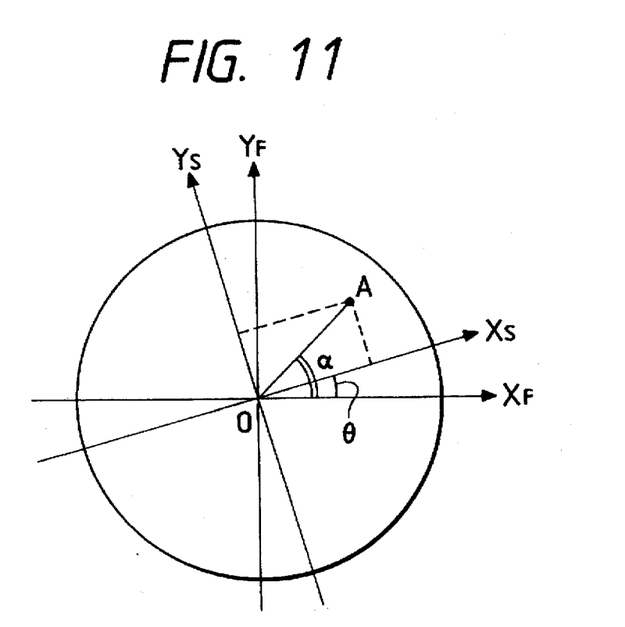
FIG. 11 is a diagram showing a relationship of a target point versus the $X_F$- and $Y_F$-axes and the $X_S$- and $Y_S$-axes in the state where the angle of rotation of the stage is θ°.

The control circuit 50 sets the ratio of the $X_s$-directional speed component to the $Y_s$-directional speed component at 1:R and thus controls the stage, whereby an object on an observation center O shown in FIG. 11 can be made to linearly reach a target point A.

For example, when L=10 mm/s, $\theta=15°$ and $\alpha=0°$, from the formulae (1) and (2), the following are established:

$$X_s\text{-Directional Speed Component}=10\times0.97=9.7 \text{ mm/s}$$

$$Y_s\text{-Directional Speed Component}=10\times(-0.26)=-2.6 \text{ mm/s}$$

Then, it follows that the sample on the stage moves at a speed of 9.7 mm/s with respect to the $X_s$-axis and at a speed of −2.6 mm/s with respect to the $Y_s$-axis. Further, from the above formula (3), the speed component ratio R at this time is given by:

$$R=-2.6/9.7=-0.27$$

Also, for example, when L=10 mm/s, $\theta=15°$ and $\alpha=45°$, from the formulae (1) and (2), the following are established:

$$X_s\text{-Directional Speed Component}=10\times0.86=8.6 \text{ mm/s}$$

$$Y_s\text{-Directional Speed Component}=10\times(0.5)=5.0 \text{ mm/s}$$

From the formula (3), the ratio R of the $X_s$-directional speed component to the $Y_s$-directional speed component is given by:

$$R=5.0/8.6=0.58$$

Thus, according to this embodiment, the operation signal for the stage 7, which has been inputted in the joy stick 30, is converted in the control circuit 50, thereby making it possible to compensate the deviation between the relative angles made by the $X_F$- and $Y_F$-axes on the basis of the observation image and by the $X_s$- and $Y_s$-axes on the basis of the stage 7. Accordingly, it follows that the skew direction of the operation lever 31 of the joy stick 30 coincides with the direction in which the sample moves within the observation visual field. The observer is thereby capable of performing the moving operation for the stage 7 without considering the angle-of-rotation $\theta$ of the stage 7.

Given next is an explanation of a case of using the jog shuttle 40. When employing the jag shuttle 40, the control circuit executes the following conversions to compensate the angular deviation due to the rotation of the stage 7.

* When the operation button 41 is pushed:
  $X_s$-Directional Speed Component=Mcos ($\theta$)
  $Y_s$-Directional Speed Component=Msin ($-\theta$)
* When the operation button 42 is pushed:
  $X_s$-Directional Speed Component=Msin ($\theta$)
  $Y_s$-Directional Speed Component=Mcos ($\theta$)
* When the operation button 43 is pushed:
  $X_s$-Directional Speed Component=−Mcos ($\theta$)
  $Y_s$-Directional Speed Component=Msin ($\theta$)
* When the operation button 44 is pushed:
  $X_s$-Directional Speed Component=Msin ($-\theta$)
  $Y_s$-Directional Speed Component=−Mcos ($\theta$)

where M is the speed coefficient (mm/s) and takes a predetermined value.

When such conversions are used, it is possible to compensate the deviation between the relative angles made by the $X_F$- and $Y_F$-axes on the basis of the observation image and by the $X_s$- and $Y_s$-axes on the basis of the stage 7, which is caused due to the rotation of the stage 7. The observer is capable of outputting a command to move the stage 7 with the aid of the jog shuttle 40 without considering the angle-of-rotation $\theta$ of the stage 7.

Note that the embodiment discussed above has the construction for detecting the rotational quantity of the stage 7 by use of the absolute encoder 25 through the operation quantity of the motor 24. That construction is not, however, required. For instance, the construction may be such that the operation quantity of the operation dial 32 of the joy stick 30 is detected by the encoder, etc. and then outputted to the control circuit, and the control circuit obtains the rotational quantity of the stage 7 on the basis of the operation quantity thereof. With this construction also, the same effect as that in the embodiment discussed above can be obtained.

Figure 12:
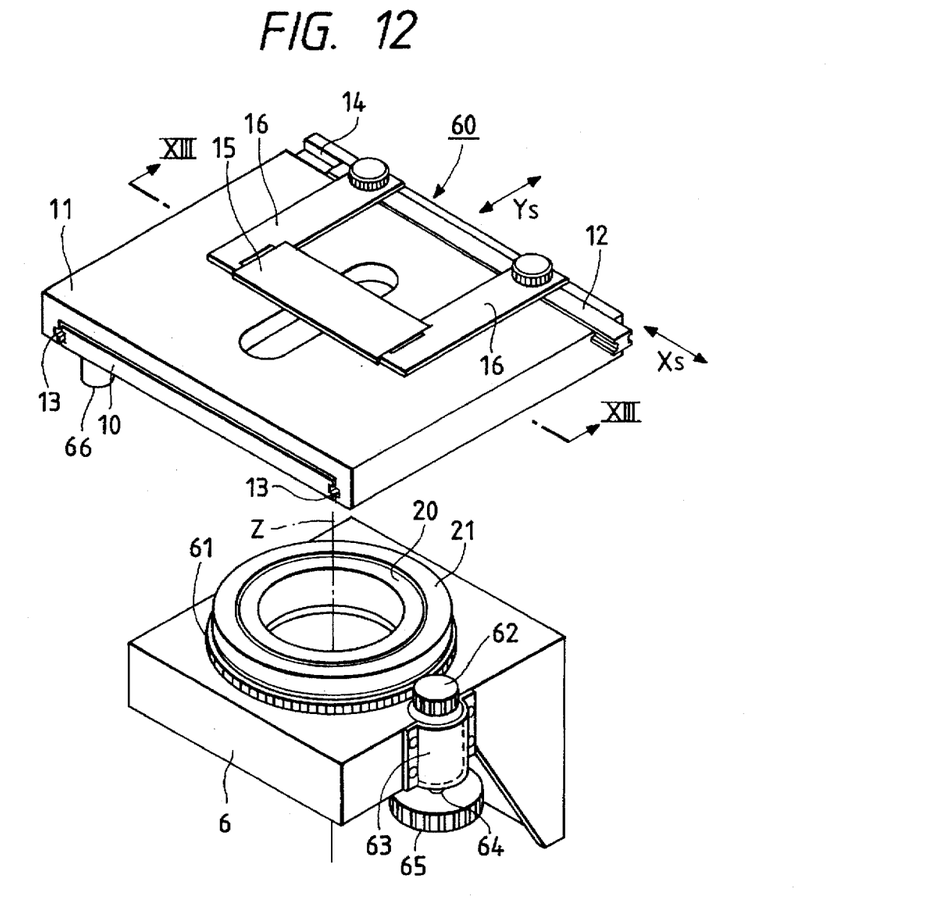
FIG. 12 is an exploded view of the stage of the microscope in a second embodiment of the present invention.
Figure 13:
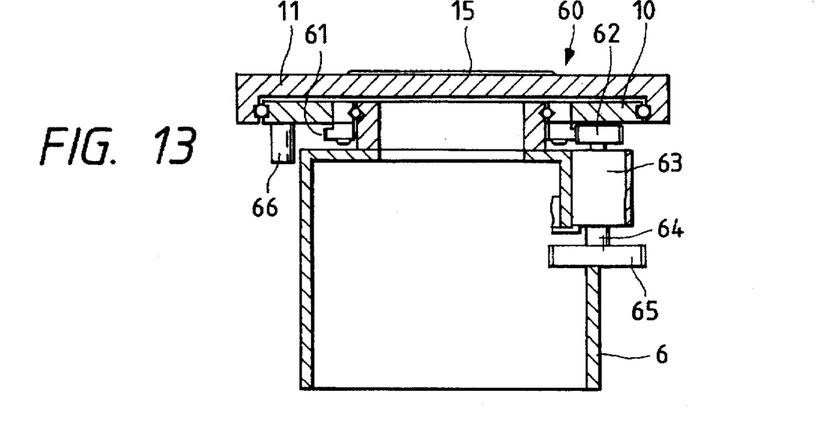
FIG. 13 is a sectional view taken along the arrowed line XIII—XIII of FIG. 12.

The driving apparatus according to the present invention can be implemented in a microscope having a manually rotated stage. FIGS. 12 and 13 illustrate a second embodiment of the present invention. FIG. 12 is an exploded view of a stage 60 that is manually rotated. FIG. 13 is a sectional view taken along the arrowed line XIII—XIII of FIG. 12. This stage 60 has substantially the same construction as the stage 7 already explained in FIGS. 3 and 4, except that the stage 60 is manually rotated. Hence, the same members as those in FIGS. 3 and 4 are marked with the like symbols, and the explanation thereof will be omitted.

A gear 61 is formed along the periphery of an outer drum 21 so attached to the periphery of the inner drum 20 as to be rotatable about the optical axis Z on the upper surface of the substage 6. A small gear 62 meshing with this gear 61 is secured to an input shaft 64 of a potentiometer 63 fixed to the substage 6. A handle 65 is fitted to an input shaft lower end 64 of this potentiometer 63. The stage 60 can be rotated by manually rotating this handle 65. Further, a knob 66 is attached to a lower surface of the guide member 10 constituting the stage 60. The stage 60 can be also manually rotated by rotating this knob 66. Then, an angle of rotation of the stage 60 rotated by the handle 65 or the knob 66 is detected by the potentiometer 63.

Figure 14:
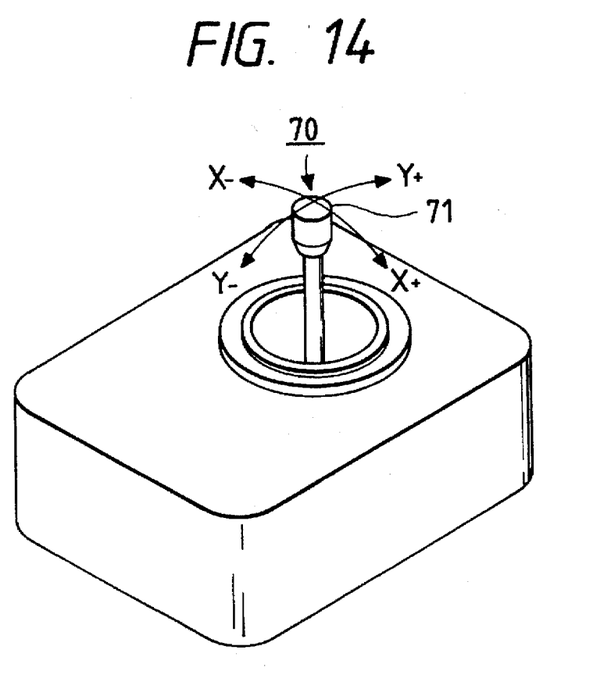
FIG. 14 is a perspective view illustrating the joy stick in the second embodiment.
Figure 15:
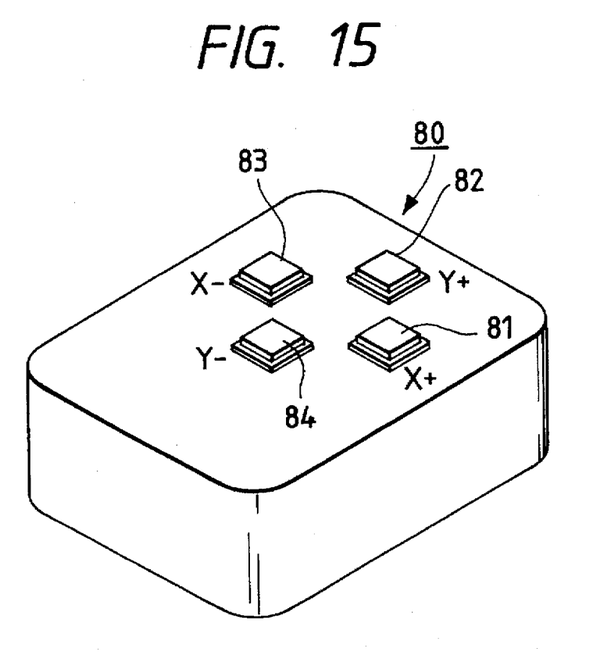
FIG. 15 is a perspective view illustrating a jog shuttle in the second embodiment.

An input member for inputting an operation signal for this stage 60 may be constructed of, e.g., a joy stick 70 as shown in FIG. 14 or a jog shuttle 80 as illustrated in FIG. 15. The joy stick 70 includes an operation lever 71 for inputting an operation signal for sliding the stage 60 but does not include an operation dial for inputting an operation signal for rotating the stage 60. Note that the joy stick 70 has substantially the same construction as the joy stick 30 explained earlier in FIG. 5 except for such a point that the operation dial is not provided, and, therefore, the explanation thereof will be omitted. The jog shuttle 80 has operation buttons 81–84 for inputting an operation signal for sliding the stage 60 but does not include the operation dial for inputting the operation signal for rotating the stage 60. Note that the jog shuttle 80 has substantially the same construction as the jag shuttle 40 explained earlier in FIG. 6 except for such a point that the operation dial is not provided, and, therefore, the explanation thereof will be omitted.

Figure 16:
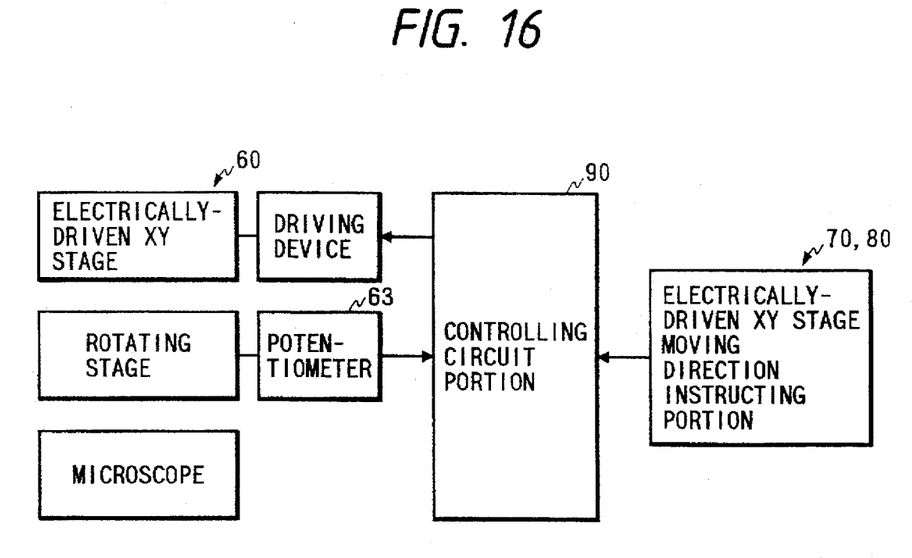
FIG. 16 is a block diagram schematically showing a construction of the microscope in the second embodiment.

FIG. 16 is a block diagram schematically illustrating the construction of this embodiment. The operation signals from the joy stick 70 or the jog shuttle 80 are inputted to a control circuit 90. The control circuit 90 performs absolutely the same arithmetic processes as those in the control circuit 50 previously explained and outputs a signal to a driving device for the stage 60. Further, a rotational quantity of the stage 60 that has been detected by a potentiometer 63 is inputted to the control circuit 90. The control circuit 90, as in the same way with the first embodiment discussed above, converts the operation signals from the joy stick 70 and the jog shuttle 80 to compensate the deviation between the relative angles made by the $X_F$- and $Y_F$-axes on the basis of the observation image of the sample observed through the eyepieces 5 of the microscope and by the $X_s$- and $Y_s$-axes on the basis of the stage 60.

In accordance with this embodiment also, the same effect as the first embodiment discussed above can be obtained.

It is apparent that, in this invention, a wide range of different working modes can be formed based on the invention without deviating from the spirit and scope of the invention. This invention is not restricted by its specific working modes except being limited by the appended claims.

What is claimed is:

1. A stage driving apparatus comprising:

a stage for mounting a sample and rotatable about an optical axis of an observation optical system for observing the sample;

two guides, for moving said stage within a plane perpendicular to the optical axis of said observation optical system, rotatable together with said stage and orthogonal to each other;

an input device for inputting a signal representing a moving direction of said stage;

a converter for converting a signal inputted to said input device based on an observation image of the sample on said stage through said observation optical system into an output signal with a compensated relative rotational deviation between a moving direction defined by the observation image and a moving direction defined by said two guides; and a driving device for moving said stage along said two guides based on the output signal from said converter.

2. The apparatus according to claim 1, further comprising:

a rotation detector, provided on said stage, for outputting a detection signal in accordance with a rotation of said stage, wherein said converter obtains a rotational quantity from a fiducial rotational position of said stage based on a signal obtained from said rotation detector and converts the signal inputted to said input device into the output signal based on the rotational quantity.

3. The apparatus according to claim 1, further comprising:

a rotating device for rotating said stage.

4. The apparatus according to claim 3, wherein said rotating device has a rotation detector for outputting a detection signal to said converter in accordance with the rotation of said stage.

5. The apparatus according to claim 4, wherein said rotation detector includes an encoder.

6. The apparatus according to claim 3, wherein said input device is capable of inputting a control signal for controlling the rotation of said stage, said rotating device rotates said stage based on the control signal, and said converter detects the rotational quantity of said stage based on the control signal inputted to said input device.

7. A stage driving apparatus comprising:

a stage two-dimensionally movable within a predetermined plane along guides for defining a first rectangular coordinate system, and rotatable about an intersection between the plane and an optical axis of an observation optical system for observing a sample placed on said stage;

a control device, having a movement operation member for moving said stage, for outputting a drive signal in relation to the first rectangular coordinate system to control said stage in accordance with an operation of said movement operation member;

a detector for detecting a rotational error quantity between the first rectangular coordinate system and a second rectangular coordinate system defined with respect to said observation optical system in said predetermined plane; and a converter for converting a drive signal from said control device into a signal in relation to the second rectangular coordinate system, in accordance with the rotational error quantity.

8. The apparatus according to claim 7, further comprising:

a rotating device for rotating said stage, wherein said control device has a rotation operating member for rotating said stage and outputs a rotation drive signal to said rotating device based on an operation of said rotation operating member, and said detector detects the rotational error quantity based on the rotation drive signal from said control device.

9. A microscope comprising:

an observation optical system for observing a sample;

a stage for mounting the sample and rotatable about an optical axis of said observation optical system;

two guides, for moving said stage within a plane perpendicular to the optical axis of said observation optical system, rotatable together with said stage and orthogonal to each other;

an input device for inputting a signal representing a moving direction of said stage;

a converter for converting a signal inputted to said input device based on an observation image of the sample on said stage through said observation optical system into an output signal with a compensated relative rotational deviation between a moving direction defined by the observation image and a moving direction defined by said two guides; and a driving device for moving said stage along said two guides based on the output signal from said converter.

10. The microscope according to claim 9, further comprising:

a rotation detector, provided on said stage, for outputting a detection signal in accordance with a rotation of said stage, wherein said converter obtains a rotational quantity from a fiducial rotational position of said stage based on a signal obtained from said rotation detector and converts the signal inputted to said input device into the output signal based on the rotational quantity.

11. The microscope according to claim 9, further comprising:

a rotating device for rotating said stage.

12. The microscope according to claim 11, wherein said rotating device has a rotation detector for outputting a detection signal to said converter in accordance with the rotation of said stage.

13. The microscope according to claim 12, wherein said rotation detector includes an encoder.

14. The microscope according to claim 11, wherein said input device is capable of inputting a control signal for controlling the rotation of said stage, said rotating device rotates said stage based on the control signal, and said converter detects the rotational quantity of said stage based on the control signal inputted to said input device.

15. A microscope comprising:

an observation optical system for observing a sample;

a stage for mounting the sample, said stage being two-dimensionally movable within a predetermined plane along two orthogonal guides and rotatable together with said two guides about an optical axis of said observation optical system;

a control device, having a movement operating member for moving said stage, for outputting a drive signal in relation to the first rectangular coordinate system defined by said guides to control said stage in accordance with an operation of said operation member;

a detector for detecting a rotational error quantity between the first rectangular coordinate system and a second rectangular coordinate system defined with respect to said observation optical system in said predetermined plane; and a converter for converting a drive signal from said control device into a signal in relation to the second rectangular coordinate system, in accordance with the rotational error quantity.

16. The microscope according to claim 15, further comprising:

a rotating device for rotating said stage, wherein said control device has a rotation operating member for rotating said stage and outputs a rotation drive signal to said rotating device based on an operation of said rotation operating member, and said detector detects the rotational error quantity based on the rotation drive signal from said control device.

* * * * *